UNITED STATES PATENT OFFICE.

JOSEPH A. BERTOLA, OF NEW YORK, N. Y., ASSIGNOR TO HIMSELF AND JOHN STAGG.

TREATMENT OF ORES OF GOLD AND SILVER.

Specification forming part of Letters Patent No. 18,789, dated December 1, 1857.

*To all whom it may concern:*

Be it known that I, JOSEPH ALCIDE BERTOLA, of New York, county of New York, and State of New York, have invented certain new and useful Improvements in Obtaining Gold and Silver from their Ores; and I do hereby declare that the following is a full, clear, and exact description of the same—that is to say:

My invention or discovery is for an improvement in treating ores of the precious metals preparatory to amalgamation, the object of said invention or discovery being to economize the operation by preventing loss in quicksilver, as well as to secure a large product of gold and silver.

This discovery is more particularly designed for treating auropyritous ores, (and the "tailings" left from such as may have been operated upon in the old way;) and the principle of my said discovery or invention lies chiefly in submitting such auropyritous ores to a treatment of pyroligneous, acetic, or other similar vegetable acid, which treatment produces certain effects upon the sulphurets of gold, whereby the metallic gold being liberated may thus be easily amalgamated with quicksilver. This treatment has also the effect to neutralize, or counteract, or correct the alkaline nature of certain gangues, which acts to impede the amalgamating process, and to render it slow and defective. It is well known that by the old way of roasting such ores or in their treatment with mineral acids and salts there is a loss to a very serious extent—in the one case by volatilization and in the other by destroying the quicksilver—and this effect is also produced by all ores of a pyritous nature, when submitted without previous chemical treatment to be amalgamated.

I have discovered that the employment of pyroligneous, acetic, or other like vegetable acids in the treatment of the ores above described, has resulted in a large saving of the mercury, and also in the increased product of gold, so much so, indeed, that I am enabled to operate very profitably upon tailings held to be too poor to pay for the working in either of the old modes. The ores are first to be reduced by grinding, in any of the usual methods, to as minute subdivision as may be, the finer the better. I then put a charge of said ores into a boiler or caldron of suitable size, according to the quantity to be operated upon. The vegetable acid is then introduced, if pyroligneous acid of the usual commercial strength—say to every bushel of the ground ore one gallon, or thereabout, of acid. The temperature is then to be raised to the boiling-point, and so continued from four to six hours, and until the whole of the acid is evaporated. The ores may now be operated upon with quicksilver in the usual way, or, as I prefer, by means of a new amalgamating-mill, a description of which I have filed in the Patent Office as a separate application for Letters Patent.

If acetic, oxalic, or other vegetable acid is to be used instead of pyroligneous, (which latter, from its cheapness and the readiness with which it may be manufactured at the mines, will be likely to be most employed,) its strength may be regulated by the addition of water; or it may be poured into the boiler where the ores have already been mixed with water, and then subjected to heat and evaporation, as before.

Heat is not absolutely necessary, its use being to hasten the process. The acid may be applied to the ground ore and allowed to act upon it for several months under the ordinary temperature of the atmosphere, and then those may be submitted to the amalgamating process.

I claim—

The use of pyroligneous, acetic, or other vegetable acids having similar chemical action, in treating gold or silver ores or tailings preparatory to amalgamation, substantially as described herein.

JOSEPH ALCIDE BERTOLA.

Witnesses:
J. P. PIRSSON,
S. M. MAYNARD.